United States Patent
Hjelm et al.

(10) Patent No.: US 8,763,032 B2
(45) Date of Patent: Jun. 24, 2014

(54) METHOD AND SYSTEM FOR PERSONALIZING AND REDIRECTING CONTENT OBJECT

(75) Inventors: Johan Hjelm, Tokyo (JP); Shingo Murakami, Kanagawa (JP); Hajime Kasahara, Yokohama (JP); Toshikane Oda, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 337 days.

(21) Appl. No.: 13/055,645

(22) PCT Filed: Jul. 25, 2008

(86) PCT No.: PCT/JP2008/063808
§ 371 (c)(1),
(2), (4) Date: Jan. 24, 2011

(87) PCT Pub. No.: WO2010/010637
PCT Pub. Date: Jan. 28, 2010

(65) Prior Publication Data
US 2011/0138413 A1    Jun. 9, 2011

(51) Int. Cl.
*H04N 7/10* (2006.01)
*H04N 21/258* (2011.01)
*H04N 21/658* (2011.01)

(52) U.S. Cl.
CPC ... *H04N 21/25883* (2013.01); *H04N 21/25891* (2013.01); *H04N 21/6582* (2013.01)
USPC .............................. 725/34; 725/93; 725/100

(58) Field of Classification Search
USPC .......................................................... 725/34
See application file for complete search history.

(56) References Cited

U.S. PATENT DOCUMENTS

2009/0158320 A1*  6/2009  Riedl et al. ...................... 725/34
2011/0265124 A1*  10/2011  Goldenberg et al. ........... 725/46

FOREIGN PATENT DOCUMENTS

| CN | 101052044 A | 10/2007 |
|----|-------------|---------|
| EP | 2150014 A1 | 2/2010 |
| WO | WO 2007/096001 | 8/2007 |
| WO | WO 2007/108638 | 9/2007 |
| WO | WO 2008/008341 | 1/2008 |
| WO | WO 2008/074435 | 6/2008 |

OTHER PUBLICATIONS

Fasbender et al, "Virtually at home: High-performance access to personal media"; Ericsson Review, vol. 2008, No. 2, Jun. 19, 2008, pp. 58-63.

(Continued)

*Primary Examiner* — Bennett Ingvoldstad
(74) *Attorney, Agent, or Firm* — Myers Bigel Sibley & Sajovec, PA

(57) ABSTRACT

A first terminal sends a message to an application server in order to redirect the same content object to a second terminal. The application server receives the message and forwards it with content object preference of the second user to the content server. The content server redirects distribution of the content object with the advertisement to the second terminal. The advertisement is personalized for the second user based on the content object preference of the second user. The advertisement for the first user is also personalized based on a content object preference of the first user. The first and second users enjoy the same content object with the different advertisement.

20 Claims, 6 Drawing Sheets

(56) References Cited

OTHER PUBLICATIONS

Friedrich et al., "Interactive and Personalized Services for an Open IMS-Based IPTV Infrastructure" IEEE Seventh International Conference on Networking, Apr. 30, 2008, pp. 302-207.
Friedrich et al., "IPTV User Equipment for IMS-Based Streaming Services" IEEE Network Operations and Management Symposium Workshops, May 2, 2008, pp. 21-25.
International Search Report for PCT/JP2008/063808, Apr. 7, 2009.
Extended European Search Report Corresponding to European Application No. 08792021.1; Date of Mailing: Jun. 18, 2012; 10 Pages.
Guenkova-Luy et al., Service Mobility with SIP, SDP and MPEG-21, $9^{th}$ International Conference on Telecommunications, Jun. 13-15, 2007, Zagreb Croatia, pp. 293-300.
International Telecommunication Union, Focus Group on IPTV, $6^{th}$ FG IPTV meeting, Oct. 15-19, 2007, Toyko, Japan, 35 pages.

\* cited by examiner

METHOD AND SYSTEM FOR PERSONALIZING AND REDIRECTING CONTENT OBJECT

CROSS-REFERENCE TO RELATED APPLICATIONS

This application is a 35 U.S.C. §371 national stage application of PCT International Application No. PCT/JP2008/063808, filed on Jul. 25, 2008, the disclosure and content of which is incorporated by reference herein in its entirety. The above-referenced PCT International Application was published in the English language as International Publication No. WO 2010/010637 on Jan. 28, 2010.

TECHNICAL FIELD

The present invention relates to redirection of content object, and particularly to personalization of the content object in the redirection.

BACKGROUND ART

Currently, it is possible to receive television (TV) program in mobile devices, as well as in television sets. The advertisements received are typically part of the media stream, and pre-formatted and pre-selected to fit the TV program. This is typically the case in the Japanese OneSeg system, which broadcasts the same TV programs and advertisements to fixed TV sets and mobile devices. In short, the advertisements are not personalized to each user.

In the case of mobile TV, there is a trend to create separate channels, e.g. manifested in services which are being broadcast over DVB-H (Digital Video Broadcast-Handheld). However, while these mobile TV systems are usable to create mobile-specific TV services, they do not have any functionality to provide for personalized content object and advertisement.

Another noteworthy background feature is the efforts undertaken to create an Internet Multimedia Subsystem (IMS)-based IPTV system. The IMS architecture document is 3GPP TS 23.228 "IP Multimedia Subsystem (IMS); Stage 2". The IMS-based IPTV is specified in ETSI TISPAN (Dedicated subsystem for IPTV functions, ETSI TS 182 028 V2.0.0 (2008-01), IPTV functions supported by the IMS subsystem, ETSI TS 182 027 V2.0.0 (2008-02), Service Layer Requirements to Integrate NGN Services and IPTV, ETSI TS 181 016 V2.0.0 (2007-11), Requirements for network transport capabilities to support IPTV services, ETSI TS 181 014 V2.0.0 (2007-11).

The IMS-based IPTV will work equally well for downloaded and streamed media. The IMS enables a control structure for the operation of multimedia streams over the Internet protocol (IP), with many underlying functions such as authentication, authorization, etc. The multimedia streams can be both real-time and downloaded, and managed by protocols which are outside of IMS.

The IMS-based IPTV systems, such as described in the preliminary specifications of the Open IPTV Forum, typically contain a number of components (Open IPTV Forum—Functional Architecture—V 1.1, Approved Jan. 15, 2008). The control plane and the media plane are separated in the IMS-based IPTV systems. A video streaming takes place in the media plane. The control plane is used to set up a session between an end-user terminal and an application server. The application server, which terminates the control plane in the system side, controls the streaming server, which delivers the actual media, such as TV programs or videos.

The streaming servers deliver a stream of video content over an IP network, often using an encapsulation and control protocol such as a Real-time Transport Protocol (RTP). The video signal is often encoded in formats such as MPEG-2 or MPEG-4. This enables the embedding of codes in the video signal, which enables a content provider to insert advertisements.

SUMMARY

In the market place, there are needs to provide a personalized content object (e.g. advertisement) to each user. However, the broadcast type TV systems can merely broadcast the same TV programs and advertisements to all users.

The important thing is that the IMS contains not only the control structure, but also a mechanism to generate and manage personal profiles, which can be leveraged to create personal advertisements. How these advertisements are personalized, and what personalization consists of, is not part of the IMS system. Particularly, a solution is needed to enable the advertisements to be personalized in the similar way as using user profiles in the case that the content object is redirected to other users.

According to the present invention, there is provided a method of distributing a personalized content object in a content distribution system. The content distribution system involves a plurality of terminals, a managing system for managing sessions and identities of users (e.g. Internet Multimedia Subsystem (IMS)), an application server and a content server. The content object may be a video content including an advertisement, or a video content accompanied with an advertisement.

A first user is registered in the managing system through the first terminal. A second user is registered in the managing system through the second terminal. The first user may be identical to the second user. The first terminal used by a first user sends a first message (e.g. INVITE) to the application server. The first message is used for requesting the previously mentioned content object.

The application server receives the first message, and requests a user profile associated with the first user from the managing system. The user profile associated with the first user includes a content object preference (e.g. advertisement preference) of the first user. The application server forwards the first message with the advertisement preference of the first user to the content server. The preferences can contain device capabilities which are derived from the session registration, e.g. the SDP capabilities information communicated in the SIP INVITE. The content server distributes the content object to the first terminal. The content object is personalized for the first user based on the received content object preference of the first user.

The first terminal sends a second message to the application server. The second message is used for redirecting the same content object to the second terminal.

The application server receives the second message, and requests a user profile associated with the user on the second terminal to the managing system. The user profile associated with the second user includes a content object preference of the second user. The application server forwards the second message with the content object preference of the second user to the content server.

The content server redirects distribution of the content object to the second terminal. The content object is personalized for the second user based on the content object preference of the second user.

BRIEF DESCRIPTION OF DRAWINGS

A more reasonable understanding of the method, apparatus and system of the present invention may be obtained by reference to the following detailed description when taken in conjunction with the accompanying drawings wherein:

FIG. 6 shows a schematic diagram of an IPTV AS.

DETAILED DESCRIPTION

In the following, two scenarios are described as embodiments of the present invention. These scenarios are provided for explanatory purpose, so claimed inventions should not be constructed as limited to these embodiments.

Figure 1:
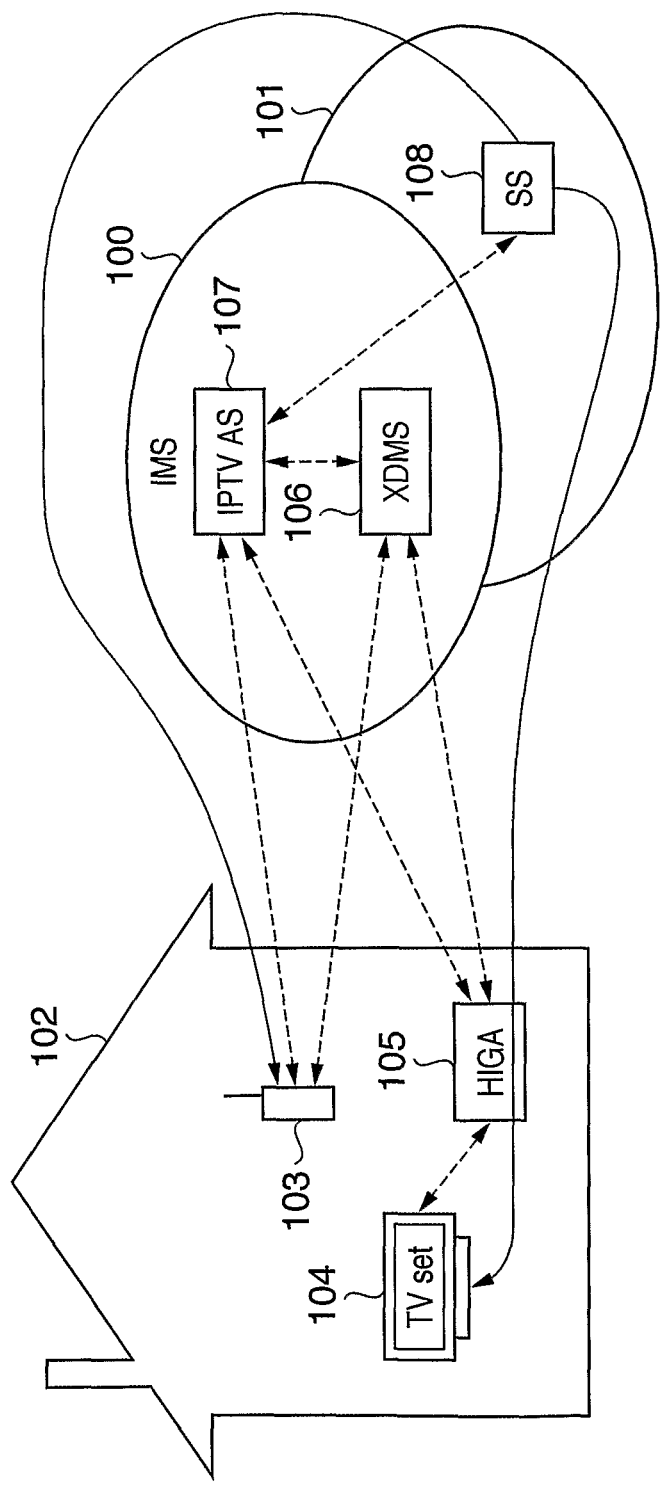
FIG. 1 shows a content distribution system in a first scenario.

FIG. 1 shows a content distribution system in a first scenario. In the figures, dotted lines represent signaling, and whole lines represent media.

In this embodiment, the content distribution system is realized in an IMS-based IPTV system. The IMS network 100 includes IMS functions such as registration function, session setup function, authentication function, authorization function and accounting function. XML Document Management Server (XDMS) 106 includes XDMS database which stores a user profile. Accesses network 101 works as a media-transporting network. As described, the control plane is located in the IMS network 100, and the media plane is located in the access network 101.

A streaming server 108 located in the access network 101 is an example of a content server. The streaming server 108 provides the content object and personalized advertisement to a mobile phone 103 and a TV set 104, respectively. Note that the "streaming server" may as also be called a "video on demand (VoD) server" or "networked personal video recorder (nPVR)", and that this is agnostic to the distribution mechanism, since the present invention works equally well for downloaded and streamed media.

IPTV AS 107 is an application server which controls distribution of content objects and advertisements, and personalization of the advertisements for each user.

A residence 102 is a home of a user. In the first scenario, the mobile phone 103 and TV set 104 are located in the residence 102. The mobile phone 103 is an IMS compliant terminal (hereinafter, IMS terminal). The TV set 104 is a non IMS terminal, however the TV set 104 acts as an IMS terminal since Home IMS Gawey (HIGA) 105 provides a translation between IMS signaling and non IMS signaling (e.g. Hyper Text Transport Protocol (HTTP) or Universal Plug and Play (UPnP)).

In the first scenario, the user forks his own (existing) session between the mobile phone 103 and the streaming server to the TV set 104 (or other display device). For example, the user selects a TV program in the IMS-based IPTV system using the mobile phone 103 and redirects the session to the TV set 104. The mobile phone 103 and the TV set 104 are owned by a first user. In the IMS network 100, the user identity of the first user is associated with the mobile phone 103 and the TV set 104 (HIGA 105). The user's profile is used to configure the advertisements displayed at both devices.

When the session has been redirected to the TV set 104 from the mobile phone 103, an original session does not have to be terminated. The original session can be re-used to send messages to the mobile phone 103 during the duration of the redirected session. These messages to the mobile phone 103 can be synchronized with what is displayed on the TV set 104 in the redirected session, i.e. the messages can be advertising. These messages can be synchronized with advertising displayed on the TV set 104. These messages can either relate to the TV programs themselves, or to the advertising, i.e. be advertising themselves. Some additional features are enabled by this, e.g. receiving points for watching advertisement on a secondary device.

Figure 2:
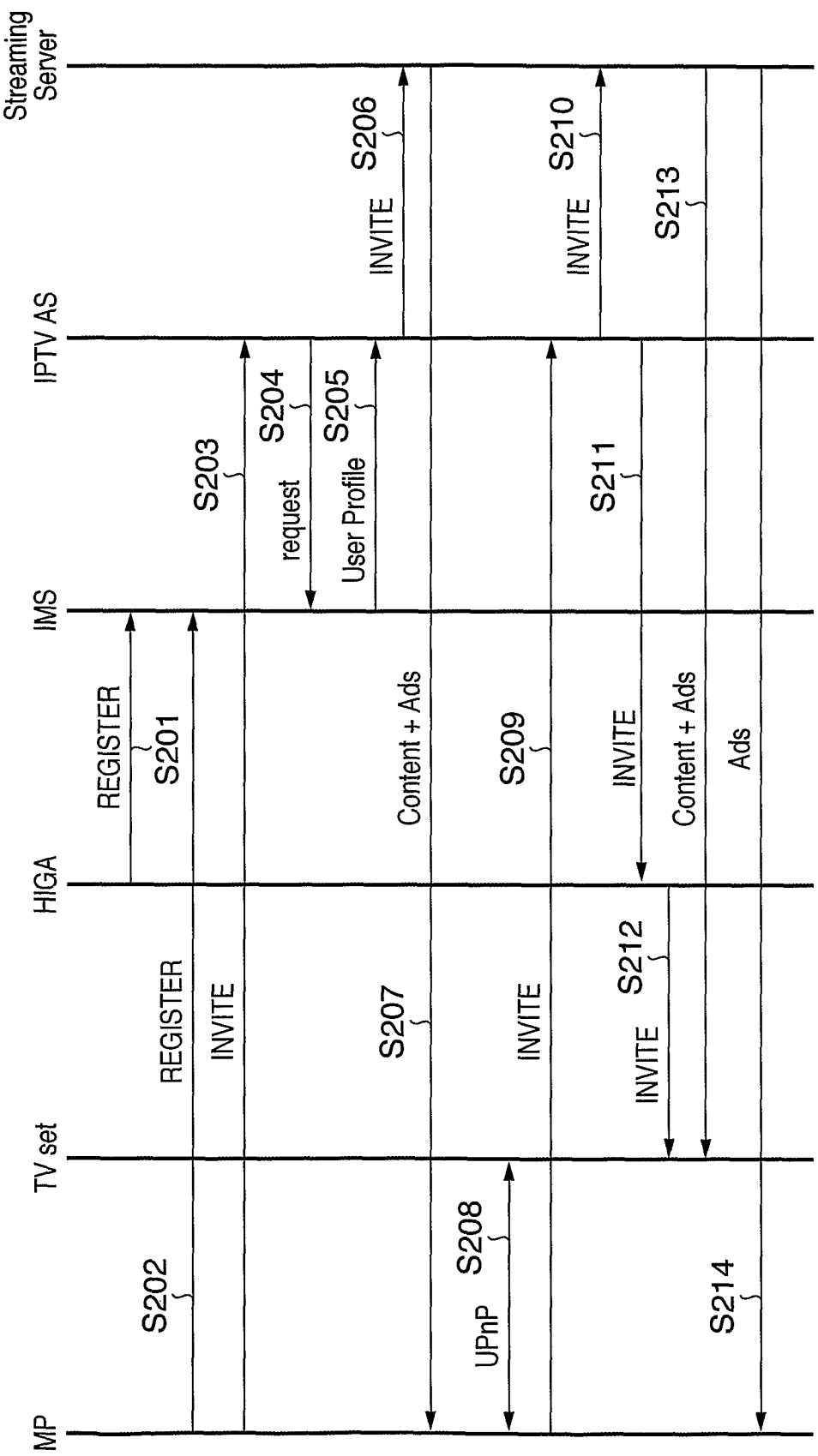
FIG. 2 shows a signaling and media sequences in the first scenario.

FIG. 2 shows a signaling and media sequences in the first scenario. The HIGA 105 sends a SIP REGSITER to the IMS network 100 to register location and presence of the user on the HIGA 105 and its connecting TV set 104 to the IMS network 100 (S201). The mobile phone 103 also sends a SIP REGSITER to the IMS network 100 to register location and presence of the user on the mobile phone 103 (S202). These registration procedures are prescribed in the IMS specifications. The IMS network 100 provides presence service according to the IMS specification. IMS terminals can obtain presence information from the IMS network 100.

The mobile phone 103 used by a first user sends a first SIP INVITE to the IPTV AS 107 (S203). The user requests a video content as a content object by sending the first INVITE. For example, the mobile phone 103 displays Electronic Program Guide (EPG) on a display device, and selects a video content (TV program) from EPG, and inserts Uniform Resource Identifier (URI) of the video content and identity of the first user to the first INVITE.

The IPTV AS 107 receives the first INVITE, and extracts the URI and the identity of the user. The IPTV AS 107 searches a user profile associated with the user on the mobile phone 103 (received identity of the user) from a storage device of the IPTV AS 107. It is not a first access to IPTV AS 107, the user profile of the first user is downloaded from the XDMS 106, and stored in the storage device of the IPTV AS 107. If the user profile is not found in the storage device, the IPTV AS 107 requests the user profile associated with the user on the mobile phone 103 to the XDMS 106 of the IMS system 100 (S204).

The XDMS 106 searches the user profile from the XDMS database, and returns the user profile to the IPTV AS 107 (S205). The user profile associated with the user on the mobile phone 103 includes an advertisement preference of the first user. The advertisement preference is, for example, car, fishing, sports, finance, travel, real-estate, movie or the like. This can be encoded in a variety of formats, from free text to mathematically formalized definitions, e.g. ontologies.

The IPTV AS 107 forwards the first INVITE with the advertisement preference of the first user to the streaming server 108 (S206). That is, the IPTV AS 107 instructs the streaming server 108 to distribute the designated video content and the advertisement personalized based on the advertisement preference of the first user.

The streaming server 108 receives the first INVITE with the advertisement preference of the first user, and chooses an appropriate advertisement for the first user based on the received advertisement preference. For example, when the advertisement preference indicates a car, an advertisement of car sales is chosen. The streaming server 108 maintains a lot of advertisements in its storage device. Thus, the streaming server 108 can pick up the appropriate advertisement. The streaming server 108 extracts the URI of the selected video content from the first INVITE, and prepares the video content based on the URI. The streaming server 108 distributes the video content with an advertisement to the mobile phone 103 (S207). The mobile phone 103 receives the video content and the personalized advertisement, renders and displays them on the display device. The mobile phone 103 also outputs audio information from a speaker of mobile phone 103.

By the way, the mobile phone 103 searches an available network device, e.g the TV set 104, using UPnP (S208). Other discovery protocol can be used instead of UPnP. Note that the discovery process is commonly performed during setup process of this system. The mobile phone 103 makes a list of the available network devices. When the redirection is instructed by the user, the mobile phone 103 displays the list to enable the user to select a network device to be redirected the same video content (session).

The mobile phone 103 sends a second INVITE to the IPTV AS (S209). The second INVITE is used for redirecting the same video content to the second terminal. The second INVITE includes, for example, an instruction of the redirection and a destination identity of the second terminal (the TV set 104 aided by the HIGA 105).

The IPTV AS 107 receives the second INVITE (S209), and extracts the destination identity. The IPTV AS 107 determines that the second user specified by part of the destination identity is identical to the first user. In the first scenario, they are the same user. In other words, a human user who is watching the video content is not changed, the mobile phone 103 becomes a secondary viewing device and the TV set 104 becomes a primary viewing device. Therefore, the user profile of the first user has been downloaded from the IMS network 100. A second request for user profile of the HIGA 105 connected to the TV set 104 is abbreviated. The IPTV AS 107 applies the same preferences to the mobile phone 103 and the TV set 104 since the user profiles are same. The user profile of the first user is still used to personalize the advertisement sent to the TV set 104.

The IPTV AS 107 forwards the second INVITE with the advertisement preference of the first user to the streaming server 108 (S210). The IPTV AS 107 directs the streaming server 108 to setup a stream of the video content to the TV set 104. The IPTV AS 107 simultaneously sets up a secondary stream of the video content to the mobile phone 103. For example, the IPTV AS 107 sends a third INVITE to the mobile phone 103 to setup the stream, in case the mobile phone 103 has closed the original session when the session to the TV set 104 has established. The session setup to the mobile phone 103 may be forked to the TV set 104.

The IPTV AS 107 forwards the second INVITE to the TV set 104 (S211). The HIGA 105 receives the second INVITE and forwards the second INVITE to the TV set 104 (S212). The TV set 104 returns an acceptance message to the HIGA 105. The HIGA 105 forwards the acceptance message to the IPTV AS 107.

The streaming server 108 redirects distribution of the video content with an advertisement to the TV set 104 (S213). The advertisement to the TV set 104 is also personalized for the first user based on the advertisement preference of the firs user. The TV set 104 receives the video content and personalized advertisement, renders and displays them on the display device. The TV set 104 also outputs audio information from a speaker of TV set 104.

Note that device characteristics of the TV set 104 and the mobile phone 103 are commonly different each other. Therefore, the streaming server 108 inspects the device characteristics of each terminal using Session Description Protocol (SDP), and executes a customization of the video content. For example, video encoding format, audio encoding format, bit rate or the like are customized base on the device characteristics of the receiving terminal. The streaming server 108 acquires the device characteristics of the TV set 104 from SDP information during a session setup between the streaming server 108 and TV set 104.

The IPTV AS 107 may inquires the mobile phone 103 whether the session between the mobile phone 103 and the streaming server 108 should be closed or not. The IPTV AS 107 closes the session between the mobile phone 103 and the streaming server 108 if the mobile phone 103 replies that the session should be closed. In this case, the IPTV AS 107 and the streaming server 108 terminates the distribution of the video content to the mobile phone 103 after the distribution of the video content with the advertisement to TV set 104 is started.

If the mobile phone 103 replies that the session should not be closed, the IPTV AS 107 and the streaming server 108 maintains the session. Note that the IPTV AS 107 and the streaming server 108 may provide both of the video content and the advertisement, or only the advertisement to the mobile phone 103 over the original session (S214). In the latter case, the streaming server 108 distribute the advertisement personalized for the first user to the mobile phone 103 even after the distribution of the video content to the mobile phone 103 is terminated.

As described above, both of personalization of advertisement and redirection of video content are simultaneously achieved. A user can change a viewing device from a mobile phone to a TV set, or vice verse while the personalization of advertisement is still maintained.

Figure 3:
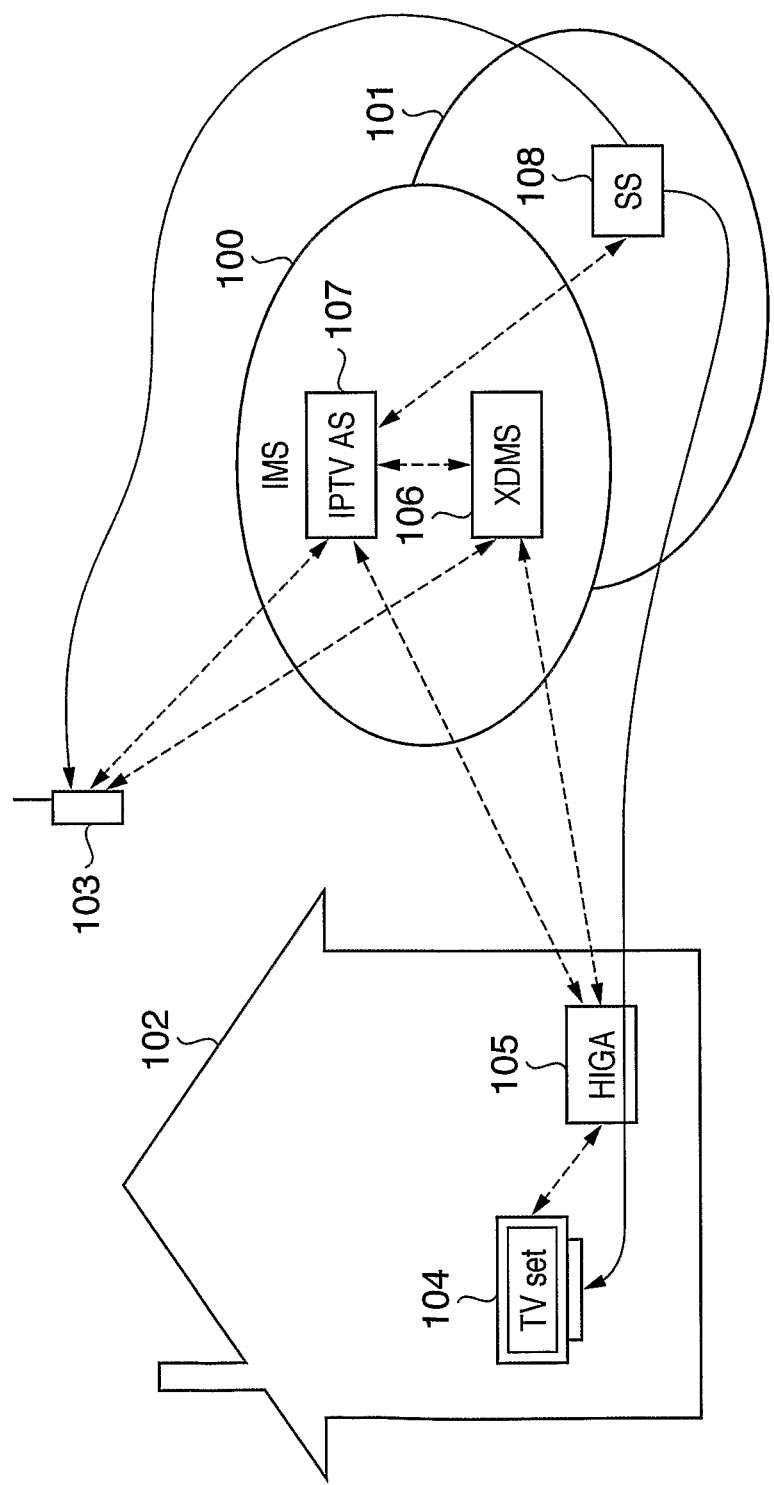
FIG. 3 shows a content distribution system in the second scenario.

FIG. 3 shows a content distribution system in the second scenario. In the figures, dotted lines represent signaling, and whole lines represent media. The same reference numeral is given to the same feature. The mobile phone 103 is associated with the first user. The HIGA 105 and the TV set 104 are associated with the second user. That is, the IMS network 100 identifies and distinguishes the first user and the second user based on the identity from IMS Subscriber Identification Module (ISIM) or Universal Integrated Circuit Card (UICC) attached in the mobile phone 103 and HIGA 105. The ISIM and the UICC are memory devices which store a device identity and a user identity. IMS Public User Identity (IMPU), which is one of the user identities, can be used in this embodiment.

In the second scenario, the first user invites another user (a second user) to view the same video stream (TV program). The same mechanisms can be applied to personalize the video stream to the second user. In essence, a different personalization is seamlessly applied to the advertisement received by the second user, in the same way as the first user, while they are both watching the same video stream.

Figure 4:
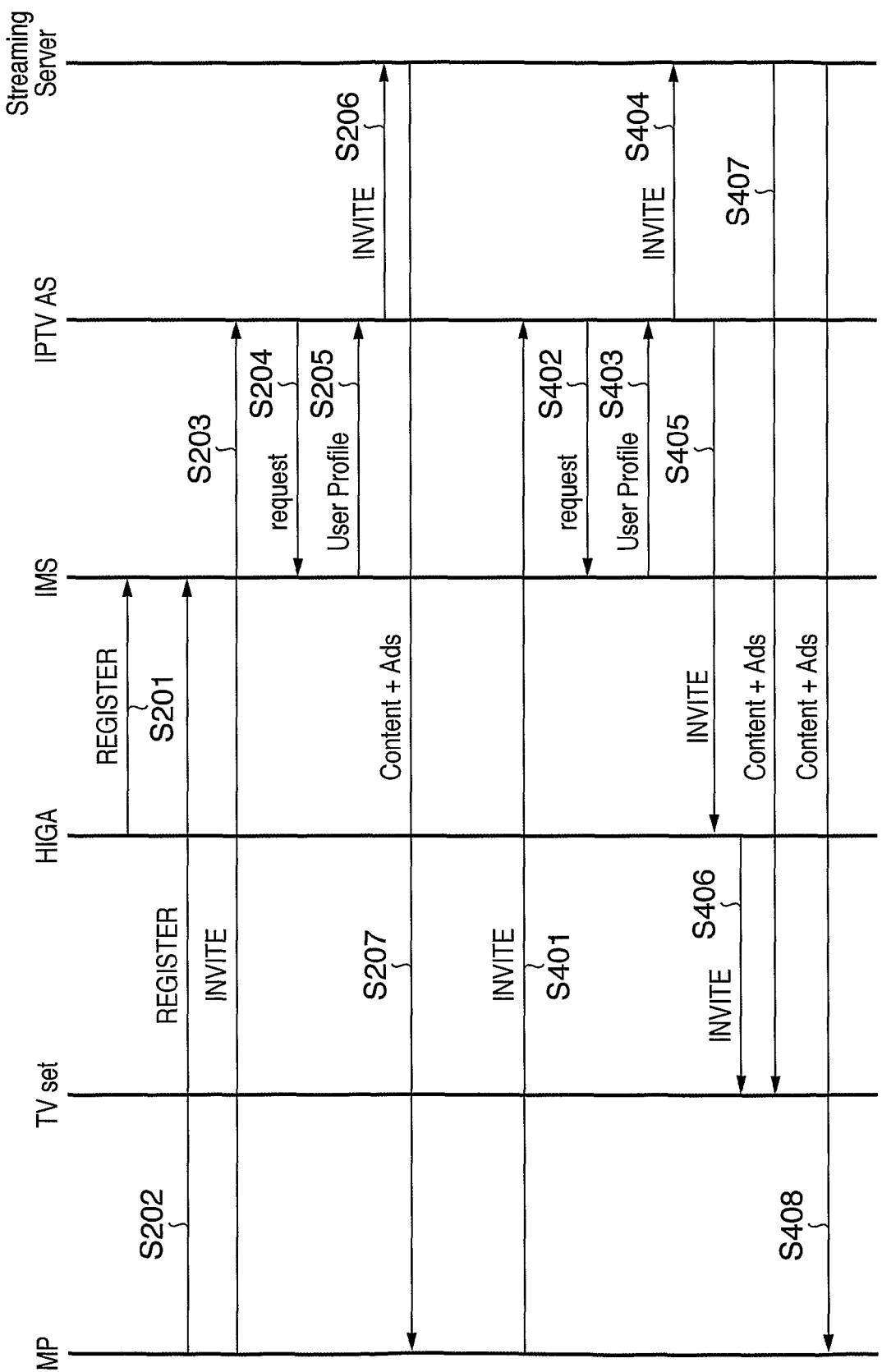
FIG. 4 shows a signaling and media sequences in the second scenario.

FIG. 4 shows a signaling and media sequences in the second scenario. The same reference numeral is given to the same feature.

The mobile phone 103 used by the first user sends a second INVITE to the IPTV AS (S209) in order to invite the second user to watch the same video content (S401). Thus, the second INVITE is for redirecting the same video content to the TV set 104 used by the second user. The second INVITE includes, for example, an instruction of the redirection and destination identity of the second terminal (the TV set 104).

The mobile phone 103 can look up the second user since the second user is registered in IMS network 100. For example, the second user is watching TV program on his TV set 104 assisted by the HIGA 105, which is registered in his presence.

The second INVITE may be a SIP re-INVITE to IPTV AS 107, including SIP URI of the second user. The SIP re-INVITE is useful to fork a session for transporting a video content.

The IPTV AS 107 receives the second INVITE (S401), and extracts the destination identity. The IPTV AS 107 determines that the second user specified by the extracted destination identity is identical to the first user. In the second scenario, they are different.

The IPTV AS 107 requests the user profile associated with the TV set 104 to the XDMS 106 (S402). The XDMS 106 searches the user profile from the XDMS database, and returns the profile of the second user to the IPTV AS 107 (S403). The user profile associated with the TV set 104 includes an advertisement preference of the second user. The advertisement preference of the second user is also, for example, car, fishing, sports, finance, travel, real estate, movie or the like.

Note that the IPTV AS 107 has downloaded the user profile of the second user, the IPTV AS 107 can abbreviate requesting for the user profile of the second user. Generally, the IPTV AS 107 has downloaded the user profile of the second user during IMS registration of the second user. For example, the IMS registration of the second user is performed when the second user is watching TV program on the TV set 104. However, the TV set 104 is used not to watch TV program through the IPTV AS 107, the IPTV AS 107 does not necessarily have the user profile of the second user since there is no current session associated with the second user. In this case, the IPTV AS 107 is required to start the IMS setup of the TV set 104.

The IPTV AS 107 forwards the second INVITE with the advertisement preference of the second user to the streaming server 108 (S404).

The streaming server 108 receives the second INVITE with the advertisement preference of the second user. The streaming server 108 chooses an appropriate advertisement for the second user based on the received advertisement preference. The streaming server 108 extracts the URI of the selected video content from the second INVITE, and prepares the video content based on the URI.

The IPTV AS 107 forwards the second INVITE to TV set 104 (S405). The HIGA 105 receives the second INVITE and forwards the second INVITE to TV set 104 (S406). The TV set 104 returns an acceptance message to the HIGA 105. The HIGA 105 forwards the acceptance message to the IPTV AS 107. The IPTV AS 107 instructs the streaming server for starting the distribution to the TV set 104.

The streaming server 108 distributes the video content with an advertisement to the TV set 104 (S407). The TV set 104 receives the video content and the personalized advertisement, renders and displays them on the display device. The TV set 104 also outputs audio information from a speaker of the TV set 104.

Note that device characteristics of the TV set 104 and the mobile phone 103 are commonly different each other. Therefore, the streaming server 108 inspects the device characteristics of each terminal using Session Description Protocol (SDP), and execute a customization of the video content. For example, video encoding format, audio encoding format, bit rate or the like are customized base on the device characteristics of the receiving terminal. The streaming server 108 acquires the device characteristics of the TV set 104 from SDP information during a session setup between the streaming server 108 and the TV set 104.

The streaming server 108 distributes the video content with the advertisement personalized for the first user to the mobile phone 103 (S407). The mobile phone 103 receives the video content and the personalized advertisement, renders and displays them on the display device. The mobile phone 103 also outputs audio information from the speaker of the mobile phone 103.

As described, the first user and the second user can enjoy the same video content with advertisements to which a different personalization is applied.

The IPTV AS 107 may inquire of the second terminal whether the TV set 104 accepts an invitation for the same video content from the mobile phone 103 or not. If the TV set 104 does not accept the invitation, the IPTV AS 107 reject the invitation from the mobile phone 103. By this, the second user can reject the invitation from the first user because of busy or the like.

The IPTV AS 107 may determine whether the mobile phone 103 stops receiving the advertisement or not. If the mobile phone 103 stops receiving the advertisement, the IPTV AS 107 instructs the streaming sever 108 on shutting off the distribution of the video contents to the TV set 104. By this, it is possible to force the user to watch the advertisement on the mobile phone 103 if the user wishes to watch the video content on the TV set 104.

Figure 5:
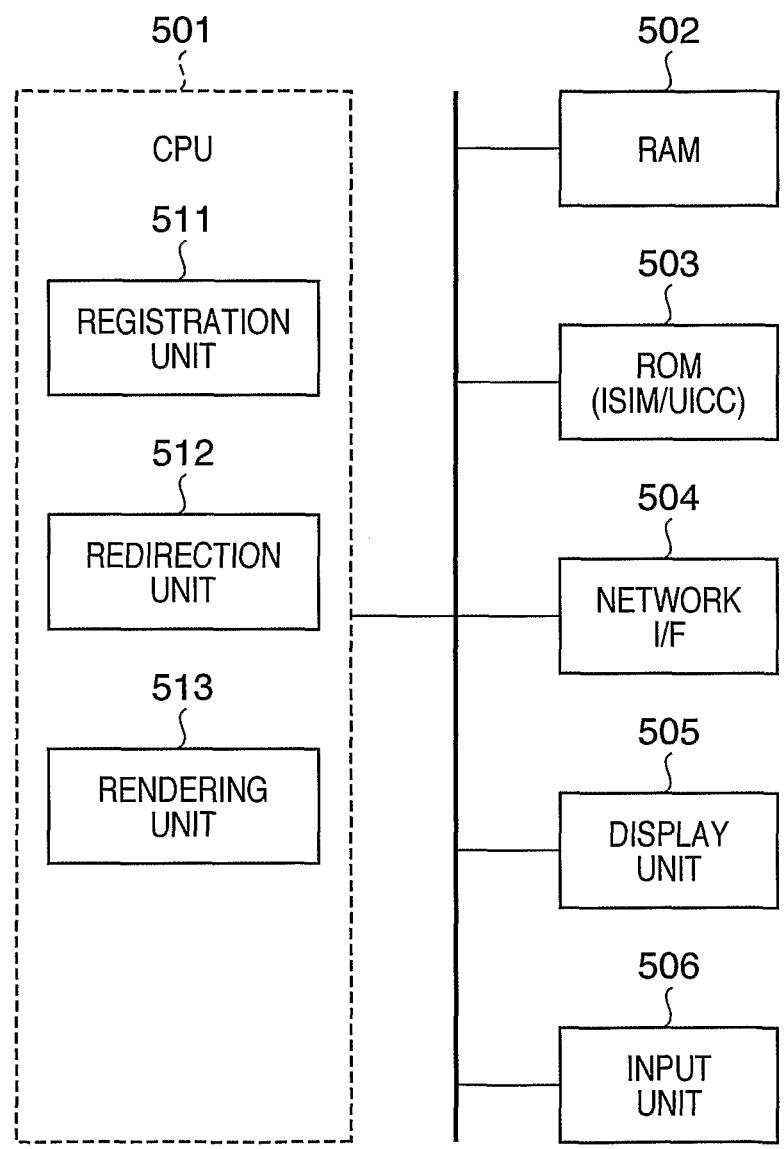
FIG. 5 shows a schematic diagram of a terminal.

FIG. 5 shows a schematic diagram of a terminal. The mobile phone 103 is the IMS terminal having the following units. CPU 501 is a processor executing computer program. RAM 502 is a storage device acting as temporally work area. ROM 503 is another storage device storing the computer program and data. The ISIM and the UICC are part of the ROM 503. Network Interface (I/F) 504 is a network communication circuit having a receiver and a transmitter. Display unit 505 is a LCD or the like outputting the graphical information such as a video content, a still image content and an advertisement. Input unit 506 is a keypad and a joystick for inputting a instruction to the CPU 501.

When the CPU 501 executing the computer program, the CPU 501 acts as a registration unit 511, a redirection unit 512 and a rendering unit 513. The registration unit 511 registers its user's presence to the ISM network 100. The redirection unit 512 sends the INVITE based on the instruction of the user input from the input unit 506. The user can input an instruction for requesting a video content as a content object and an instruction for requesting redirection of the video content. The rendering unit renders the video content and the personalized advertisement received from the streaming server 108.

Figure 6:
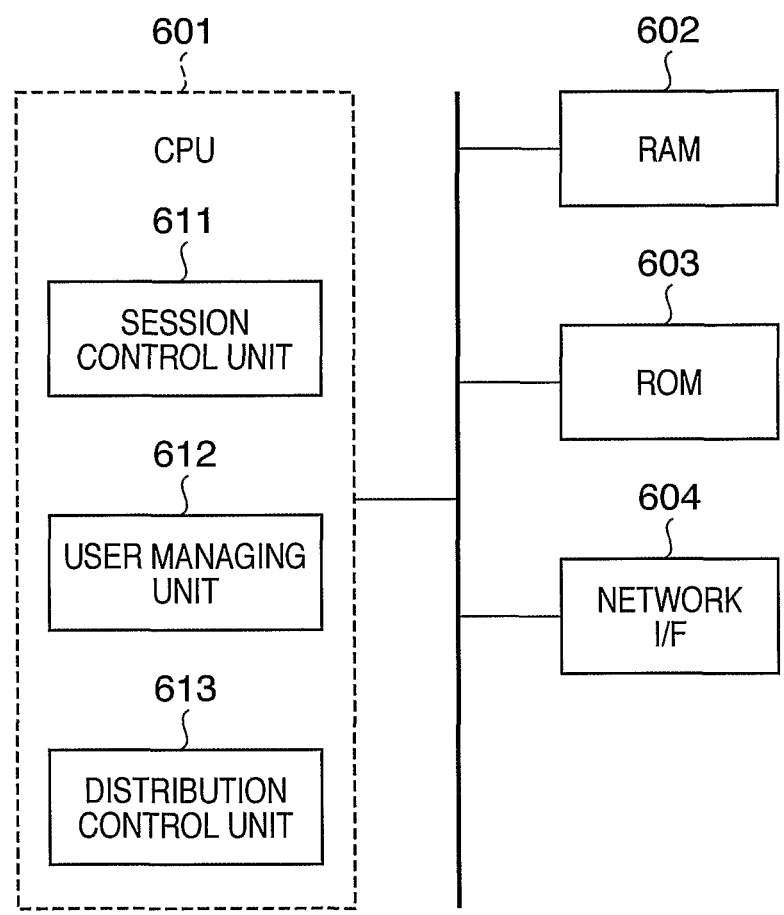

FIG. 6 shows a schematic diagram of an IPTV AS. The IPTV AS 107 has the following units. CPU 601 is a processor executing computer program. RAM 602 is a storage device acting as temporally work area. Particularly, RAM 602 stores the user profile downloaded from the XDMS 106. ROM 603 is another storage device storing the computer program and data. Network Interface (I/F) 604 is a network interface card having a receiver and a transmitter.

When the CPU 601 executing the computer program, the CPU 601 acts as a session control unit 611, a user managing unit 612 and a distribution control unit 613.

The session control unit 611 controls a session relating to a IPTV service. For example, when the session control unit 611 receives the first INVITE from the mobile phone 103 using the network I/F 604 and establishes the session.

The user managing unit 612 manages user profile relating to ongoing session. For example, when the user sends the first INVITE, the user managing unit 612 determines whether the user profile of the user has been stored in the RAM 602 or not. In case the user profile of the user has not been stored yet, the user managing unit 612 requests the user profile of the user to the XDMS 106. The user managing unit 612 extracts the advertisement preference of the user from the received user profile of the user.

The distribution control unit 613 controls the streaming unit 108 based on the instruction of the user. For example, the distribution control unit 613 forwards the first INVITE with the advertisement preference of the first user to the streaming server 108.

If the session control unit 611 receives the second INVITE for redirecting the same video content to a TV set, the user managing unit 612 determines whether the second user is identical to the first user. If they are same users (the first scenario), the user managing unit 612 read out the user profile from the RAM 602 and passes the user profile to the distribution control unit 613. If they are different users (the second scenario), the user managing unit 612 requests to the XDMS 106 a user profile of the second user. The user managing unit 612 extracts the advertisement preference of the second user from the received user profile of the second user.

The distribution control unit 613 forwards the second INVITE with the advertisement preference of the second user to the streaming server. That is, the distribution control unit 613 instructs the streaming server 108 to redirect the distribution of the video content with the personalized advertisement to the TV set 104.

In the above-described embodiments, the managing system for managing sessions and identities of users is implemented in an Internet Multimedia Subsystem (IMS). This is just an example. The managing system may be other managing system implemented using Web Services. One of these Web Services is Parlay X developed by Parlay Group. Another example of Web Services is shown at the following web site (http://www.ibm.com/developerworks/library/specification/ws-fedworld/).

Although several embodiments of the method, apparatus and system of the present invention have been illustrated in the accompanying drawings and described in the foregoing description, it will be understood that the invention is not limited to the embodiments disclosed, but is capable of numerous rearrangements, modifications and substitutions without departing from the spirit of the invention as set forth and defined by the following claims.

The invention claimed is:

1. A method of distributing a personalized content object in a content distribution system including a plurality of terminals, a managing system for managing sessions and identities of users, an application server and a content server, the method comprising:
sending a first message from a first terminal used by a first user to said application server, the first message being for requesting a content object;
receiving, at said application server, said first message;
requesting a first user profile associated with said first user on said first terminal from said application server to said managing system, the first user profile including a content object preference of the first user;
forwarding said first message with the content object preference of the first user from said application server to said content server;
distributing the content object from said content server to said first terminal, the content object being personalized for the first user based on the content object preference of the first user;
sending a second message from said first terminal to said application server, the second message being for redirecting the content object to a second terminal;
receiving, at said application server, said second message;
requesting a second user profile associated with said second user on said second terminal from said application server to said managing system, the second user profile including a content object preference of a second user who uses said second terminal;
forwarding said second message with the content object preference of the second user from said application server to said content server; and
redirecting distribution of the content object from said content server to said second terminal, the redirected content object being personalized for the second user based on the content object preference of the second user.

2. A method according to claim 1, wherein the content object is video content including an advertisement, or a video content accompanied with an advertisement.

3. A method according to claim 1, further comprising:
determining that the second user is identical to the first user; and
applying the content object preference of the first user to the content object preference of the second user, instead of requesting the second user profile associated with said second user on said second terminal from said application server to said managing system, responsive to determining that the second user is identical to the first user.

4. A method according to claim 1, further comprising:
customizing a format of the content object to be distributed from said content server to said second terminal according to device characteristics of said second terminal, wherein the device characteristics of said second terminal are acquired from description information received during a session setup between said content server and said second terminal.

5. A method according to claim 1, wherein the managing system is implemented in an Internet Multimedia Subsystem (IMS).

6. A method according to claim 1, wherein the managing system is implemented using Web Services.

7. A method according to claim 1, further comprising:
inquiring from said application server to said first terminal whether a session between said first terminal and said content server should be closed;
closing the session between said first terminal and said content server responsive to the first terminal indicating that the session should be closed; and
maintaining the session between said first terminal and said content server responsive to the first terminal indicating that the session should not be closed.

8. A method according to claim 2, further comprising:
terminating the distributing of the content object from said content server to said first terminal after the redirecting of the content object from said content server to said second terminal is started.

9. A method according to claim 8, further comprising:
distributing the content object personalized for the first user from said content server to said first terminal after terminating the distributing of the content object from said content server to said first terminal.

10. A method according to claim 1, wherein at least one of said first and second terminals is configured by an IMS Gateway (IG) and is a non-IMS terminal, said IG comprising a translator for translating between IMS signaling and non- IMS signaling, and said non-IMS terminal comprising a output device for outputting the personalized content object.

11. A method according to claim 1, further comprising:
extracting, at said application server, a user identity of a user from the received first and/or second message; and
obtaining, at said application server, a user profile corresponding to the extracted user identity from said managing system.

12. A method according to claim 1, wherein the first and second user profiles are XDMS profiles stored in XDMS database of an Internet Multimedia Subsystem (IMS).

13. A method according to claim 1, further comprising:
inquiring from said application server to said second terminal whether said second terminal accepts an invitation for the content object from said first terminal; and
rejecting, at said application server, the invitation from said first terminal when said second terminal does not accept the invitation.

14. A method according to claim 1, further comprising:
determining, at said application server, that said first terminal stops receiving the advertisement; and
providing an instruction from said application server to said content server on shutting off the distribution of the content objects responsive to determining that said first terminal stops receiving the advertisement.

15. A system for distributing a personalized content object, the system comprising:
a first terminal used by a first user and configured to register the first user to a managing system for managing sessions and identities of users, and to send a first message for requesting a content object;
a second terminal configured to register a second user who uses said second terminal, to said managing system;
an application server configured to receive said first message, and to request to said managing system a first user profile, associated with the first user on said first terminal, including a content object preference of the first user, and to forward said first message with the content object preference of the first user; and
a content server configured to receive the first message with the content object preference of the first user, and to distribute to said first terminal the content object personalized for the first user based on the content object preference of the first user,
wherein said first terminal is further configured to send to said application server a second message for redirecting the content object to said second terminal,
wherein said application server is further configured to receive said second message, and to request to said managing system a second user profile, associated with the second user on said second terminal, including a content object preference of the second user, and to forward said second message with the content object preference of the second user to said content server, and
wherein said content server is further configured to redirect distribution of the content object to said second terminal, the content object redirected to said second terminal being personalized for the second user based on the content object preference of the second user.

16. A system according to claim 15, wherein the managing system is implemented in an Internet Multimedia Subsystem (IMS).

17. A system according to claim 15, wherein the managing system is implemented using Web Services.

18. An application server utilized in a system for distributing a personalized content object, the system including a plurality of terminals, a managing system for managing sessions and identities of users and a content server, said application server including at least one processor configured to:
receive a first message for requesting a content object, the first message being sent from a first terminal used by a first user, and the first user being registered to said managing system;
request a first user profile associated with said first user on said first terminal to said managing system, the first user profile including a content object preference of the first user;
forward said first message with the content object preference of the first user to said content server, wherein said content server is configured to receive the first message with the content object preference of the first user, and to distribute to said first terminal the personalized content object for the first user based on the received content object preference of the first user;
receive from said first terminal a second message for redirecting the content object to a second terminal;
request to said managing system a second user profile associated with a second user on said second terminal including a content object preference of a second user; and
forward said second message with the content object preference of the second user to said content server, wherein said content server is further configured to redirect distribution of the content object to said second terminal, the content object redirected to said second terminal being personalized for the second user based on the content object preference of the second user.

19. An application server according to claim 18, wherein the managing system is implemented in an Internet Multimedia Subsystem (IMS).

20. An application server according to claim 18, wherein the managing system is implemented using Web Services.

* * * * *